(12) United States Patent
Anderson et al.

(10) Patent No.: US 8,549,391 B2
(45) Date of Patent: Oct. 1, 2013

(54) SYSTEM AND METHOD FOR TAGGING DATA

(75) Inventors: John Anderson, San Francisco, CA (US); Doug Whitmore, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 95 days.

(21) Appl. No.: 13/300,528

(22) Filed: Nov. 18, 2011

(65) Prior Publication Data
US 2012/0131494 A1 May 24, 2012

Related U.S. Application Data

(63) Continuation of application No. 11/498,464, filed on Aug. 3, 2006, now Pat. No. 8,065,601.

(51) Int. Cl.
*G06F 3/048* (2013.01)

(52) U.S. Cl.
USPC ............................ 715/206; 715/208; 715/780

(58) Field of Classification Search
USPC .................................................. 715/206, 208
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,065,601 B2 | 11/2011 | Anderson et al. | |
| 8,479,122 B2 | 7/2013 | Hotelling et al. | |
| 2002/0107829 A1* | 8/2002 | Sigurjonsson et al. | ........... 707/1 |
| 2004/0225667 A1* | 11/2004 | Hu et al. | ....................... 707/100 |
| 2006/0197753 A1 | 9/2006 | Hotelling | |
| 2008/0033851 A1* | 2/2008 | Williams et al. | ................ 705/34 |
| 2009/0043624 A1* | 2/2009 | Fioca et al. | ....................... 705/7 |
| 2009/0144628 A1* | 6/2009 | Stevens et al. | ................ 715/733 |

FOREIGN PATENT DOCUMENTS

| | | | |
|---|---|---|---|
| JP | 2000-163031 A | 6/2000 | |
| JP | 2002-342033 A | 11/2002 | |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

(Continued)

*Primary Examiner* — Andrea Leggett
(74) *Attorney, Agent, or Firm* — Morrison & Foerster LLP

(57) ABSTRACT

A system and related methods for tagging data, especially in the context of a web-based application, includes various features associated with a tag bar. A text field is displayable in conjunction with such tag bar, as is a list of any potential tags. Data can be received corresponding to a tag to be added to the tag bar. Once the tag bar has been added, it is displayed in the tag bar.

33 Claims, 4 Drawing Sheets

(56) References Cited

OTHER PUBLICATIONS

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

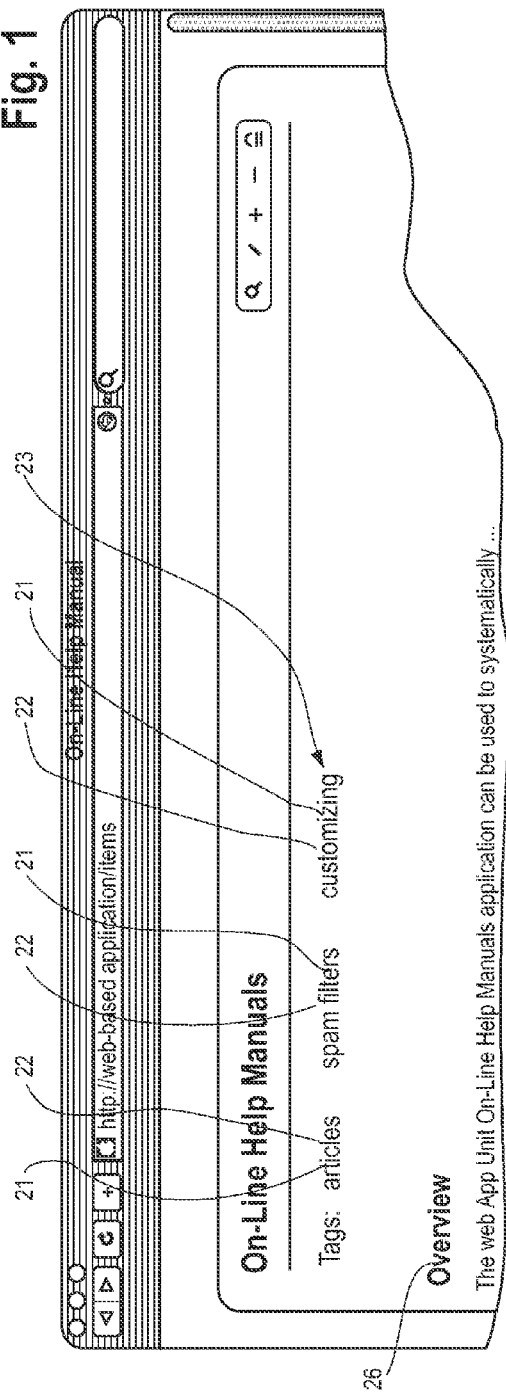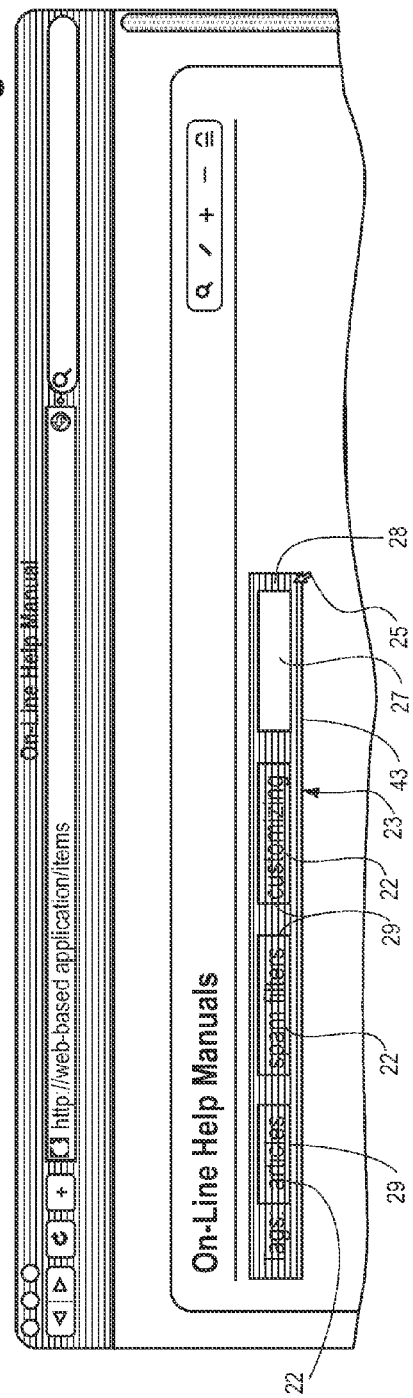

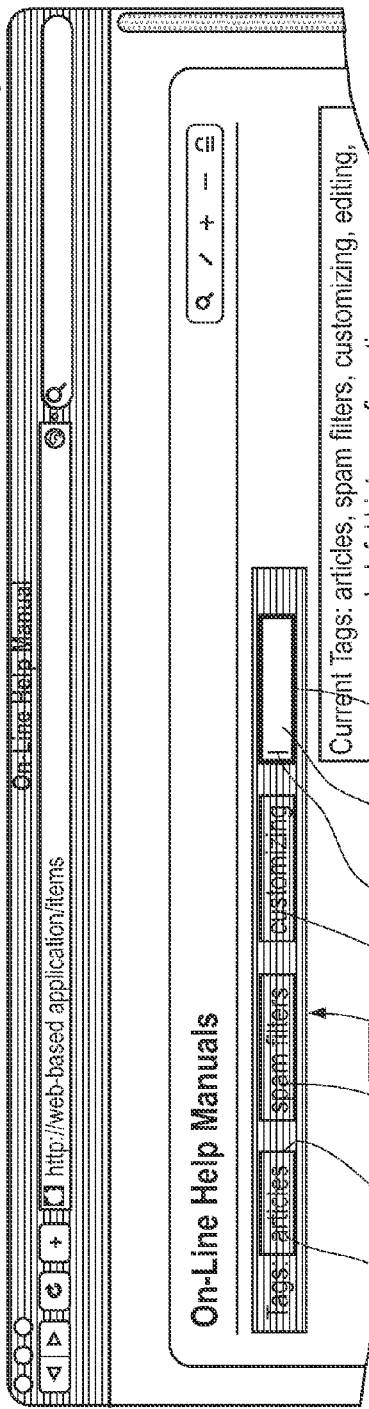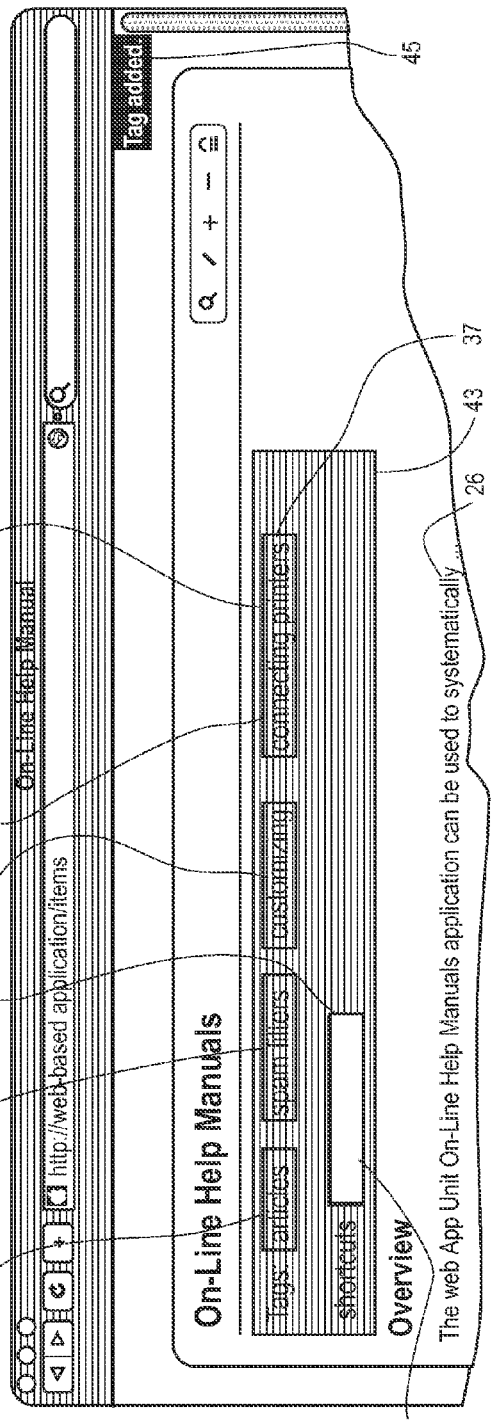

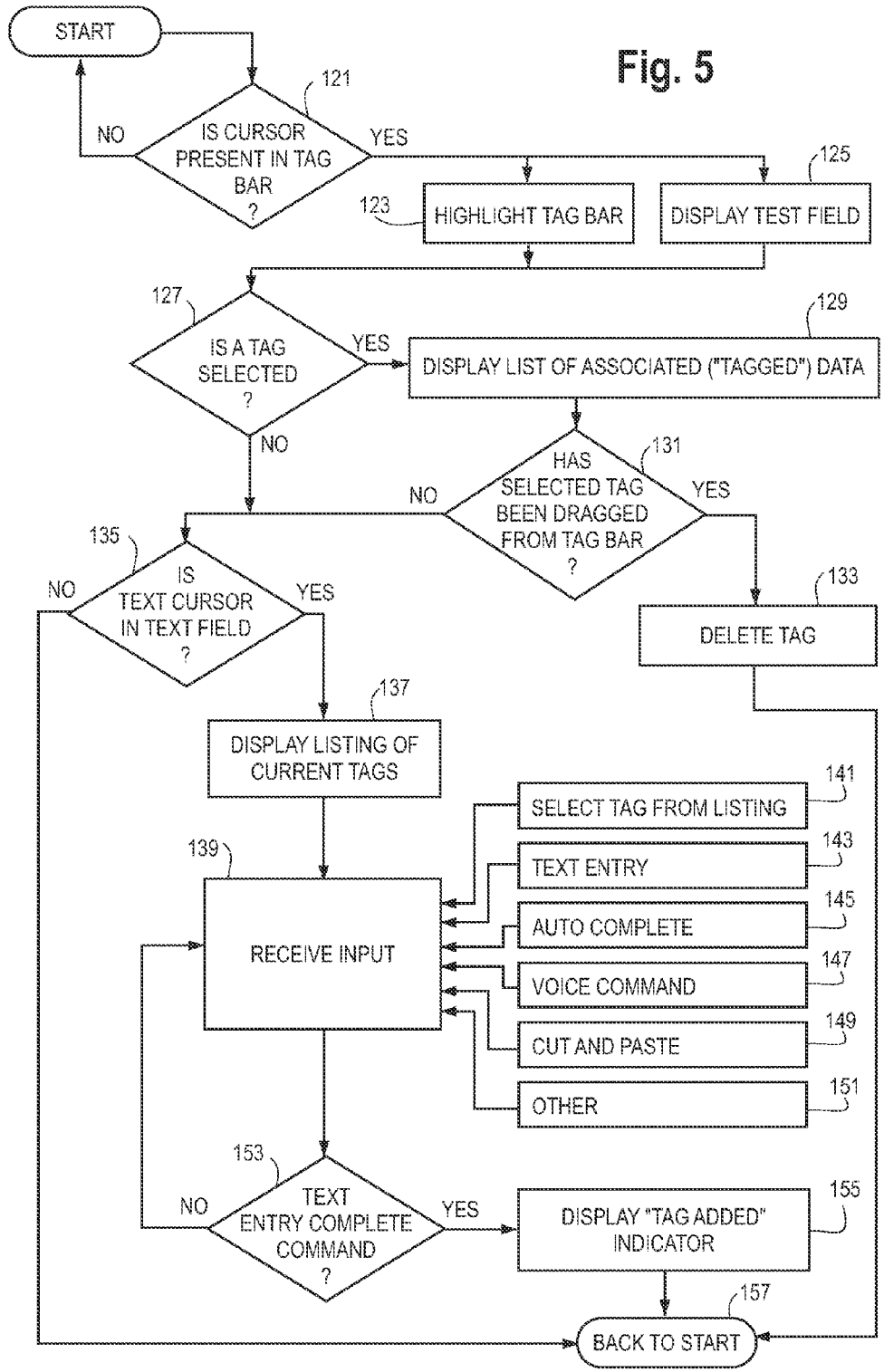

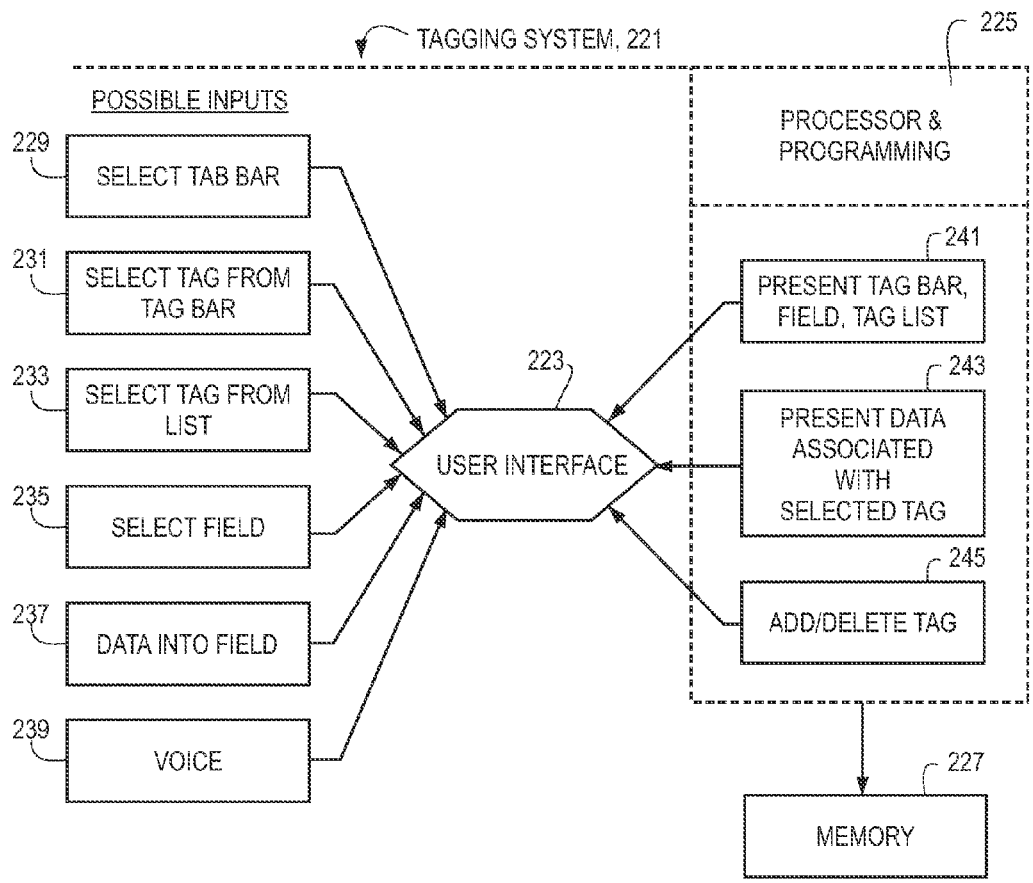
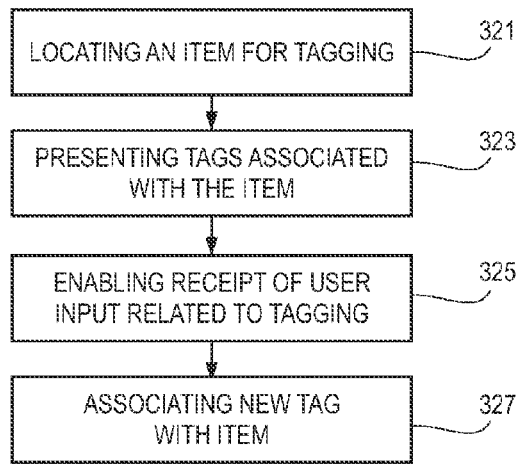

SYSTEM AND METHOD FOR TAGGING DATA

CROSS-REFERENCE TO RELATED APPLICATIONS

This application is a continuation of U.S. patent application Ser. No. 11/498,464, filed on Aug. 3, 2006, the entire contents of which are hereby incorporated by reference.

FIELD OF INVENTION

This document relates to a system and related methods for tagging data.

BACKGROUND

Web-based software applications are available to tag data accessible through a computer network, such as the world-wide web. Such tags are generally terms or key words associated with data or content. Such data or content is often associated with one or more websites, databases, or other data storage. By tagging certain data or content of the website with one or more terms or key words, that content or data can be identified, organized, manipulated or searched according to the associated tag or tags.

Tagging has numerous applications, especially in web-based settings, and can be used in conjunction with a vast range of data, such as photos or text, individual entries or entire articles, or even websites themselves or other software applications. Applications can include tagging data associated with individuals, or extended to family, work-groups, entire companies, communities of interest, or the world population. Although tags can be assembled in lists or arranged in groups (referred to as "tag clouds") accessible to one or more users of web-based applications, it remains desirable to ease tagging of data, especially in web-based applications.

SUMMARY

According to one aspect, a method of tagging data comprises displaying a field in a tag bar, displaying a list of potential tags for association with the data, receiving input corresponding to a tag to be added to the tag bar, and associating the input with the data to be tagged.

The details of one or more implementations of the invention are set forth in the accompanying drawings and the description below. Other features, objects, and advantages of the invention will be apparent from the description and drawings, and from the claims.

DESCRIPTION OF DRAWINGS

FIGS. 1-4 are partial screen shots of one implementation of user interfaces presented by a tagging system;

FIG. 5 is a flow chart of one exemplary method for tagging data;

FIG. 6 is a system diagram of one exemplary tagging system; and

FIG. 7 is a flow chart of another exemplary method for tagging data.

Like reference symbols in the various drawings indicate like elements.

DETAILED DESCRIPTION

Referring now to FIGS. 1-4, screen shots of a user interface for tagging data are shown in the context of a working example. The user interface can be produced by a tagging system that is described in more detail below. In the example shown, certain "on-line help manuals" have been accessed through a suitable web-based application. Portions of data 26 (FIG. 1) in these on-line help manuals are displayed or accessible to one or more users. Data 26 may be associated with tags by such user or users, or by other means. The current user or other users have access to the web-based application of this implementation and have associated tags with data 26 of the on-line help manuals. Users may wish to add further tags to data 26. Although it is understood that tags can be any word or phrase, symbol or other indicator helpful to one or more users of the web-based application, in this case, tags 22 have been given text entries 21 and appear labeled as "articles," "spam filters," and "customizing" in a tag bar 23. In one implementation, tags 22 are graphical elements comprising mostly the text themselves, but it will be appreciated that the tags can appear in any form that is suitable for the application, spirit, or aesthetic of the user or application designer.

Similarly, tag bar 23 is shown toward the top of screen 25 but could be formatted to appear in any other suitable location, along the left or right edges, for example, or tag bar 23 could appear selectively in response to certain user inputs. Likewise, the exact shape or form of tag bar 23 can be varied in any number of ways as skill or fancy might suggest, including not only the traditional "bar" shape shown in the illustrated example, but also a listing or other presentation. In one implementation the tags presented have different relative sizes based on their importance or frequency of use by either this user or a set or users.

Whatever its shape or exact form, as shown in FIG. 2, when a user selects (e.g., mouses over tag bar 23, positions cursor 25 in tag bar 23, or otherwise selects) tag bar 23, an indication (e.g., visual or audible) is provided, shown in this implementation as a highlighted area 28 around tag bar 23 and its associated tags 22. In addition, in one implementation, upon selection of tag bar 23, a blank text field 27 appears in highlighted area 28 of tag bar 23. As explained subsequently, blank text field 27 can be used to add tags to the data (e.g., content of a web application). Where the tagged item is a web application, the additional tags can correspond to content which is either displayed by, or accessible by operation of, the web-based application.

Tag bar 23 may likewise be associated with suitable programming to provide the tag bar 23 with additional functions or interactivity. Thus, for example, when tag bar 23 is interacted with (e.g., selected or moused-over, etc.), visual cues, boundaries, or delimiters 29 may appear. One form of such visual boundaries is for tags 21 to assume the form and function of user-selectable "buttons", as shown in FIG. 2. Another possible visual cue could involve a change of color of tags 22 when selected. These visual cues or delimiters 29 may prove useful to the user in navigating the tag bar 23.

In one implementation, when cursor 25 is positioned over a corresponding one of tags 22, suitable programming searches for data which has been associated with such tag, and the results of such search are suitably displayed, such as in list form (not shown), by the web-based application. The results may likewise be accessed via hot links or displayed in any number of alternate forms.

Returning now to text field 27 and referring now to the implementation shown in FIG. 3, when text field 27 is selected, a highlighted box 31 appears around text field 27 and a text cursor 33 appears therein. When text cursor 33 appears in text field 27, suitable programming causes a list 35 of potential tags to appear (e.g., near text field 27 and tag bar 23). By displaying list 35 in association with operations associated with adding a tag, a user is assisted in tagging the data. List 35 can include a larger set of tags 24 than appear in tag bar 23 so as to assist the user in his or her tagging. The number and variety of tags 24 appearing in list 35 can vary greatly depending on the particular application. Thus, for example, it may be appropriate for list 35 to include those tags which a particular user or group of users have used in the past, either for the data (e.g., a web application for on-line help manuals), in particular, or historically over time for related data (e.g., related applications). In other applications, it may be appropriate for list 35 to include not only the tags of this or other users, but certain standard or default tags generally suitable, such as generally suitable for material accessed by the particular web application, or simply helpful suggestions in general.

Whatever the source of tags 24 appearing in list 35, suitable programming is provided to access individual tags 24 to fill in text field 27. Thus, a user may scroll through tags 24, highlighting one or more tags in the process, until a desired tag is found. At such point, a user performs a suitable operation to select a tag from list 35, causing it to appear in text field 27. A user may also input data into text field 27 by text entry from an associated keyboard, cutting and pasting, voice command, and the like. Text input may be assisted by including "autocomplete" operations when the user begins entering text into text field 27.

Once the desired text for an additional tag has been placed in text field 27, whether by text entry, by selecting from list 35, or otherwise, one or more suitable user inputs is received to add the additional tag to the tag bar and associate it to the data. For example, the user may hit the "enter," "return," or "tab" key, or enter another suitable command or keystroke, in response to which the text entered in text field 27 becomes an additional tag 22 associated with data 26. As shown in FIG. 4, the tag "connecting printers" has been added. When a tag 22 has been added by suitable user input, in one implementation, a visual indication 45 is displayed. In this case, visual indication 45 comprises a graphical element in the form of a flag of contrasting color in the upper right corner labeled with the text "tag added." Other visual indications and locations of such visual indications are possible.

The system and related methods for tagging data shown in this implementation may include still other features and associated programming to ease operations associated with tags, especially in the context of web-based applications. So, for example, any of the tags 22 displayed in tag bar 23 (FIGS. 1-4) can be selected by suitable user input and then deleted, either by keyboard command or by dragging the selected tag off tag bar 23. The system may include programming to indicate the deletion of the tag from tag bar 23, such as by using a suitable sound, or by including a static or animated visual indicator. A "puff of smoke" coinciding with the deletion would be one suitable visual indication.

Referring more particularly to FIG. 4, suitable programming resizes tag bar 23 as a function of how many potential tags are in tag bar 23. In one implementation, once a sufficient number of tags 22 have been added on a first line 37, the tags wrap around to a second line 39, and tag bar 23 is correspondingly enlarged. Suitable indication of the resizing of tag bar 23 can be provided. In this case, programming can create a larger highlighted box 41 which is selectively displayed during the addition of tags to the potential tags.

The user interface and associated system and methods can be implemented on any suitable microprocessor-equipped electronic device, such as one or more computers in the broadest sense of the word, PDAs, music players, cell phones, and any other electronic, convergence device. The user interface of the above-described implementation can be a graphical interface or can be audible or non-visual, making use of voice inputs and outputs. Referring now to the system block diagram of FIG. 6, tagging system 221 includes a suitable user interface 223, including the features described above; a processor and associated programming code 225, including instructions that implement the functions and methods described; and access to data stored in suitable memory 227. The system 221 is operable to receive the possible inputs discussed previously, including selecting the tag bar 23 itself, selecting a tag 22 from the tag bar, selecting a tag 24 from the list 35, selecting field 27, inputting data to field 27, or using voice input (blocks 229, 231, 233, 235, 237, and 239, respectively). Instructions are executed in response to certain inputs, including presenting the tag bar, field or tag list, presenting data items which have been tagged with a selected tag, or adding and deleting a tag (blocks 241, 243, and 245, respectively).

The system can involve one or more servers or other computers operating a suitable web-based application, or can be implemented in non-web-based settings. One suitable application works in conjunction with the OS X Server by Apple Computer, Inc.

Operation of the above-described system and the performance of its related methods is readily apparent from the foregoing description. Referring now to the flow diagram of FIG. 5, a user moves a pointer or a similar cursor to tag bar 23 in order to perform one of the various functions associated with the tagging system of this implementation. When such cursor location is detected (block 121), tag bar 23 is highlighted (block 123) and text field 27 is displayed (block 125).

If a user wishes to display data associated ("tagged") with a tag in the tag bar, the user selects the tag (block 127). If the user wishes to delete one of the potential tags 22 from tag bar 23, then, in response to user's selection and, for example, dragging tag 22 away from tag bar 23 (block 131), suitable programming is initiated to perform the deletion (block 133).

If a tag is to be added to tag bar 23, the user may position text cursor 35 in text field 27 (block 135). Upon such operation, list 35 of tags 24 currently associated with the data is displayed (block 137). Input corresponding to the tag to be added is then received in block 139. Such input can take the form of selecting one of the tags 24 from list 35, text entry by keyboard or other suitable command, autocomplete, voice command, cut and paste, or any other suitable input operation (blocks 141, 143, 145, 147 149 151). Regardless of the means of text entry, to confirm text entry has been completed, programming checks for input of a suitable delimiter or completion command (block 153), such as hitting the tab or return key. Once such completion command is received, a "tag added" indicator is optionally displayed (block 155). Any of the above-described features can generally be accessed in any order at any point in time upon positioning of cursor in tag bar 23, as indicated by the "Back to Start" block 157.

An exemplary operation of tagging system 221 is shown generally in the flow chart of FIG. 7. A data item to be tagged is located (321), tags which are associated with such item are presented (323), and suitable programming enables receipt of user input related to tagging (325). In response to receiving input, a new tag is associated with the data item (327).

A number of the implementations of the invention have been described. Nevertheless, it will be understood that various modifications may be made without departing from the spirit and scope of the invention. Thus, for example, although tags are traditionally text-based, other possibilities, such as "icons," "emoticons" or other graphical elements may be used as tags. Tags 22, whether existing in tag bar 23 or added thereto, have been shown displayed in horizontal spaced relation to each other, but may likewise be displayed in any number of spatial relationships to each other, including vertically or even as overlapping "tabs."

Similar variations are possible in conjunction with displaying list 35 of currently available tags 24. While the illustrated implementation displayed list 35 when text cursor 33 was placed in text field 27, any number of alternative provisions for displaying list 35 can be provided. For example, list 35 need not be displayed immediately upon placement of text cursor 33 in text field 27. Rather, the list 35 can be displayed after a lapse of a set amount of time. Such delay may correspond to indecision or uncertainty by the user in entering text into text field 27 and so the appearance of list 35 could assist in resolving such indecision. In one implementation, list 35 can be displayed immediately whenever cursor 25 rolls over locations corresponding to or near tag bar 23. The location of list 35 in this implementation is adjacent or near tag bar 23 but could alternately be at any other suitable location on the display screen.

The appearance of tag bar 23 in one implementation varies from an unselected, "dormant" state shown in FIG. 1 to a highlighted or active state corresponding to, for example, roll over of cursor 25, shown in FIGS. 2-4. In one implementation of its highlighted state, tag bar 23 displays a boundary 43 between tag bar 23 and the rest of data 26. Any number of variations to the appearance of tag bar 23 are possible depending on the particular application. For example, even in its dormant or unselected state, tag bar 23 can be associated with a suitable boundary, color, highlighting, or other visual indication to distinguish it from surrounding data 26. Similarly, tag bar 23 in its selected or active state can be associated with additional graphical elements or other indicators corresponding to selective operations or functions associated with tagging and manipulations on tag bar 23. It should also be understand that the term "bar" when used in the phrase "tag bar," is not intended to limit the area in which the tags are displayed to the shape of a bar or rectangle. Rather, tag bar refers to an area of the user interface that is designated to include tags and thus includes any two- or three-dimensional space or spaces displaying tags 22, such as vertical listings, tag clouds, overlapping tabs, tags hidden by each other, tags displayed sequentially over time, and the like.

Still other implementations are within the scope of the following claims.

What is claimed is:

1. A method, comprising:
providing for display a tag bar, the tag bar configured to present one or more tags, each of the one or more tags operable for association with a data item;
receiving an input selecting the tag bar;
in response to the input selecting the tag bar, changing the tag bar by at least adding an input field to the tag bar, the input field including a text field;
detecting a user interaction with the input field; and
in response to detecting user interaction with the input field, providing for display one or more potential tags for association with the data item,
wherein the method is performed by one or more processors.

2. The method of claim 1, wherein input selecting the tag bar includes a movement of a cursor or a pointer over the tag bar.

3. The method of claim 1, wherein the text field is a blank text field.

4. The method of claim 1, wherein the user interaction with the input field includes a placement of a cursor or pointer in the input field.

5. The method of claim 1, further comprising:
describing the selected tag audibly to a user.

6. The method of claim 1, further comprising:
receiving selection of at least one of the potential tags; and
associating the selected potential tag with the data item, wherein associating the selected potential tag with the data item includes adding the selected potential tag to the tag bar.

7. The method of claim 6, further comprising providing for display the added tag in the tag bar.

8. The method of claim 1, wherein changing the tag bar includes providing for display indications of the selection, the indication including at least one of a visual cue, an added boundary, or an added delimiter.

9. The method of claim 1, further comprising:
receiving a deletion input for deleting at least one of the one or more tags; and
in response to the deletion input, deleting the at least one tag.

10. The method of claim 9, wherein deleting the at least one tag includes providing an animated visual indicator for deleting the at least one tag.

11. The method of claim 1, wherein providing for display one or more potential tags includes providing the one or more potential tags for display as a list.

12. Computer instructions stored on a non-transitory computer-readable medium, configured to cause one or more processors to perform operations comprising:
providing for display a tag bar, the tag bar configured to present one or more tags, each of the one or more tags operable for association with a data item;
receiving an input selecting the tag bar;
in response to the input selecting the tag bar, changing the tag bar by at least adding an input field to the tag bar;
detecting a user interaction with the input field; and
in response to detecting user interaction with the input field, providing for display one or more potential tags for association with the data item.

13. The instructions of claim 12, wherein the input field comprises a blank text field and is provided for display in response to the first input.

14. The instructions of claim 13, wherein the input includes a movement of a cursor or a pointer over the tag bar.

15. The instructions of claim 12, wherein the user interaction with the input field includes a placement of a cursor or pointer in the input field.

16. The instructions of claim 12, the operations further comprising receiving data corresponding to a tag to be added to the tag bar, wherein receiving the data includes receiving the data in response to user entry of text into the input field.

17. A computer system comprising:
one or more processors;
means for displaying a tag bar, the tag bar configured to present one or more tags, each of the one or more tags operable for association with a data item;
means for receiving an input selecting the tag bar;
means for changing the tag bar in response to the input selecting the tag bar by at least adding an input field to the tag bar;
means for detecting a user interaction with the input field; and
means for displaying, in response to the user interaction with the input field, one or more potential tags for association with the data item.

18. The computer system of claim 17, wherein the input field is a blank text field associated with the tag bar for receiving a user input.

19. The computer of claim 17, wherein the user interaction with the input field includes a placement of a cursor or a pointer in the input field.

20. The computer system of claim 17, wherein the means for displaying the one or more potential tags includes means for displaying the list near the tag bar from which one of the potential tags is user-selectable.

21. The computer system of claim 17, further comprising means for deleting a tag from the tag bar in response to a user input.

22. The computer system of claim 21, wherein the means for deleting operates in response to a user input of selecting the tag and dragging the tag away from the tag bar.

23. The computer system of claim 21, further comprising means for presenting an indication of a deletion of the tag from the tag bar in response to the deletion.

24. The computer system of claim 17, wherein the tag bar comprises multiple tags, and the computer system comprises means for resizing the tag bar as a function of how many tags the tag bar includes.

25. The computer system of claim 17, wherein the means for displaying the tag bar includes means for displaying multiple tags in spaced relation to each other.

26. The computer system of claim 17, wherein the tag bar comprises at least one existing tag, and wherein the computer system comprises means for adding an additional tag to the tag bar.

27. The computer system of claim 17, wherein the means for displaying the tag bar includes means for displaying a boundary of the tag bar.

28. The computer of claim 17, wherein providing for display one or more potential tags includes providing the one or more potential tags for display as a list.

29. The computer system of claim 17, further comprising means for displaying a visual indication in response to adding a tag to the tag bar.

30. A computer system comprising:
a processor programmed to perform operations comprising:
providing for display a tag bar, the tag bar configured to present one or more tags, each of the one or more tags operable for association with a data item;
receiving an input selecting the tag bar;
in response to the input selecting the tag bar, changing the tag bar by at least adding an input field to the tag bar;
detecting a user interaction with the input field; and
in response to detecting the user interaction with the input field, providing for display one or more potential tags for association with the data item.

31. The system of claim 30, wherein the operations further comprise presenting other data items associated with a selected tag.

32. The system of claim 30, wherein the operations further comprise:
receiving a selection of a potential tag to be added to the tag bar; and
adding the potential tag to the tag bar.

33. The system of claim 30, wherein the user interaction with the input field includes a movement of a cursor or pointer into the input field.

* * * * *